United States Patent [19]

Wentworth, Jr.

[11] 3,776,560

[45] Dec. 4, 1973

[54] BELLOWS TYPE FLUID SEAL

[75] Inventor: Robert S. Wentworth, Jr., Wilmington, Calif.

[73] Assignee: Borg-Warner Corporation, Chicago, Ill.

[22] Filed: Mar. 4, 1971

[21] Appl. No.: 121,099

[52] U.S. Cl. ................................. 277/88, 277/93
[51] Int. Cl. ............................................. F16j 15/36
[58] Field of Search ............... 277/41, 42, 43, 88, 277/89, 90, 38, 93 R

[56] References Cited
UNITED STATES PATENTS
2,700,562  1/1955  Cole ............................. 277/DIG. 9

Primary Examiner—Samuel B. Rothberg
Attorney—Donald W. Banner, William S. McCurry and John W. Butcher

[57] ABSTRACT

A bellows type mechanical fluid seal combination including a first sealing ring structure having an annular sealing face adapted for mounting to a stationary member, a second sealing ring structure having a complementary annular sealing face adapted for mounting to a rotatable member, and an axially extendible cylindrical bellows structure included with one of the sealing ring structures and cooperating to urge the sealing faces of the sealing rings into sealing relationship responsive to applied fluid pressure. The improvement resides in the relative shape and configuration provided for one of the sealing ring structures to attain improved utilization of sealing face areas within a seal installation space of limited dimensions.

5 Claims, 6 Drawing Figures

BELLOWS TYPE FLUID SEAL

BACKGROUND OF THE INVENTION

This invention generally pertains to a diaphragm bellows type mechanical seal suitable to limit passage of fluids between a rotating shaft and a stationary housing member and useful in applications such as pumps.

Bellows seals are well developed in the art as shown in U.S. Pats., No. 3,318,604, No. 3,388,913, No. 3,479,040, No. 3,495,840, No. 3,498,620 and No. 3,526,408, for example.

In bellows seals of the type described herein, the advantages of utilizing a maximum contacting sealing face and ensuring an increasing tendency to permit adequate fluid migration to lubricate the sealing faces as pressure increases is uniquely important. In such a bellows, for a given set of conditions, there is a diameter (at some location between its bore and outside diameter) which can be thought of as being equivalent or compared to the diameter referred to as the "balance diameter" in the secondary sealing system of non-bellows type seals. In approximation, for normal bellows at normal pitches, this "balance diameter" is considered to be about the mean diameter of the bellows. A full understanding of all the factors involved is beyond the present state of the art but it is apparent to those familiar with bellows behavior that the balance diameter is not fixed but rather is a resultant of varied forces tending to close the bellows versus forces tending to extend the bellows and that many, if not all, of such forces are dependent upon the tensile and beam characteristics of the diaphragm making up the bellows and the effect of bellows pitch on such characteristics.

A bellows subjected to pressures low enouch not to cause significant distortion of its shape from its unpressurized state can be considered as series of stiff flat annular rings joined by frictionless hinges (so long as no motion is involved and only static forces are considered); in such a case it can be seen that all forces from differential pressure are balanced by means of tensile and compressive loads passed through the hinges except for the outer 50 percent of the area of the extreme convolution halves (diaphragms). Thus, the hydraulic load transmitted by a bellows under these conditions is virtually identical to that of a piston of the same diameter as the mid point of the bellows span.

At higher pressures, however, the bellows diaphragms do distort, tending to close together at their outside and distend at the welds at their inside. In this circumstance much of the bellows on the side toward the pressure has assumed a plain radial configuration (or moved toward this limiting condition) and is thus in effect no longer part of the bellows. Thus we have a "new bellows" of unchanged inside diameter (assuming pressure from outside the bellows) but its new outside diameter is reduced, moving its new mean diameter closer to the inside diameter.

If the bellows is operated at very close pitch this effect of span closure occurs at lower pressure (since the diaphragms are nearly vertical to start with); thus a seal having, for example, 70 percent of its sealing face area outside the mean diameter of the full bellows at low pressure, may have 100 percent sealing face area outside the new balance diameter under high operating pressure.

These considerations would indicate that the balance diameter of a bellows is closer to its inside diameter at high pressure than at low pressure. However, any seal which is to take advantage of the bellows behavior must be certain to have a sealing contact outside or near the bellows balance diameter at low pressure despite previous wear. The prior art ensures this by using little of available surface within the balance diameter for sealing contact. Such requirement is wasteful of space and, since the balance diameter does shift, subjects the sealing faces to high unit loading or stress thereby increasing face wear. Further, the bellows spring force must be limited to a reasonable unit loading on the carbon face (for any seal). Thus a small face area requires a "softer" bellows spring rate (for the same deflection).

Another consideration of equal importance is that a bellows installed with the bellows in the near nested or closed position is highly resistant to pressure but has very little tendency to shorten, i.e., retract. This decrease in unloading forces is a condition which is permissible with the present invention but unacceptable with prior art designs, particularly when attempting to utilize the increased pressure capability of the bellows in such a close pitch position.

SUMMARY OF THE INVENTION

The present invention provides a bellows type seal of configuration such that, at high pressure, formation of a lubricating film is encouraged while ensuring that a low pressure contact area of the seal face will be sufficiently greater than the effective balance diameter of the bellows to ensure closure after a period of wear.

The present invention also provides a bellows type seal having maximum utilization of seal face areas in an annular seal installation space of limited dimensions.

The present invention further provides a bellows type seal permitting a majority of the sealing area of the sealing faces within the mean diameter of the bellows and yet with which the sealing action may be reestablished after extended use when high operating fluid pressure is relieved then reapplied.

The present invention also provides a bellows type seal which is operative with minimal stress on the bellows.

The present invention further provides a bellows type seal in which the bellows design need not be critical but which may be of thicker yet weaker material chosen in a particular application primarily for corrosion resistance, weldability, and/or least expense, rather than strength and resilience characteristics.

The foregoing and other attributes and advantages are attained in a bellows seal having a stationary sealing ring structure provided with an annular lapped sealing face on its front end, a rotatable sealing ring structure provided with a complementary annular lapped sealing face on its front end and an extendible bellows means hermetically connected to the rear end of one of the sealing ring structures and adapted to force the sealing ring structures and lapped sealing faces together in sealing relation responsive to fluid pressure applied across the bellows means, the improvement comprising, radial support means included with the sealing ring structure connected to the bellows means which is adapted to selectively resist inward radial elastic deflection of the sealing ring caused by application of the fluid pressure, such resistance to deflection being to a greater degree at the front of the seal ring near the lapped sealing face than the resistance to deflection at the rear end of the sealing ring so that the resultant deflection of the sealing ring will preferably urge the inner periphery of the annular sealing face into initial and increasing sealing engagement with the other sealing face.

DESCRIPTION OF THE PREFERRED EMBODIMENT

Figure 1:
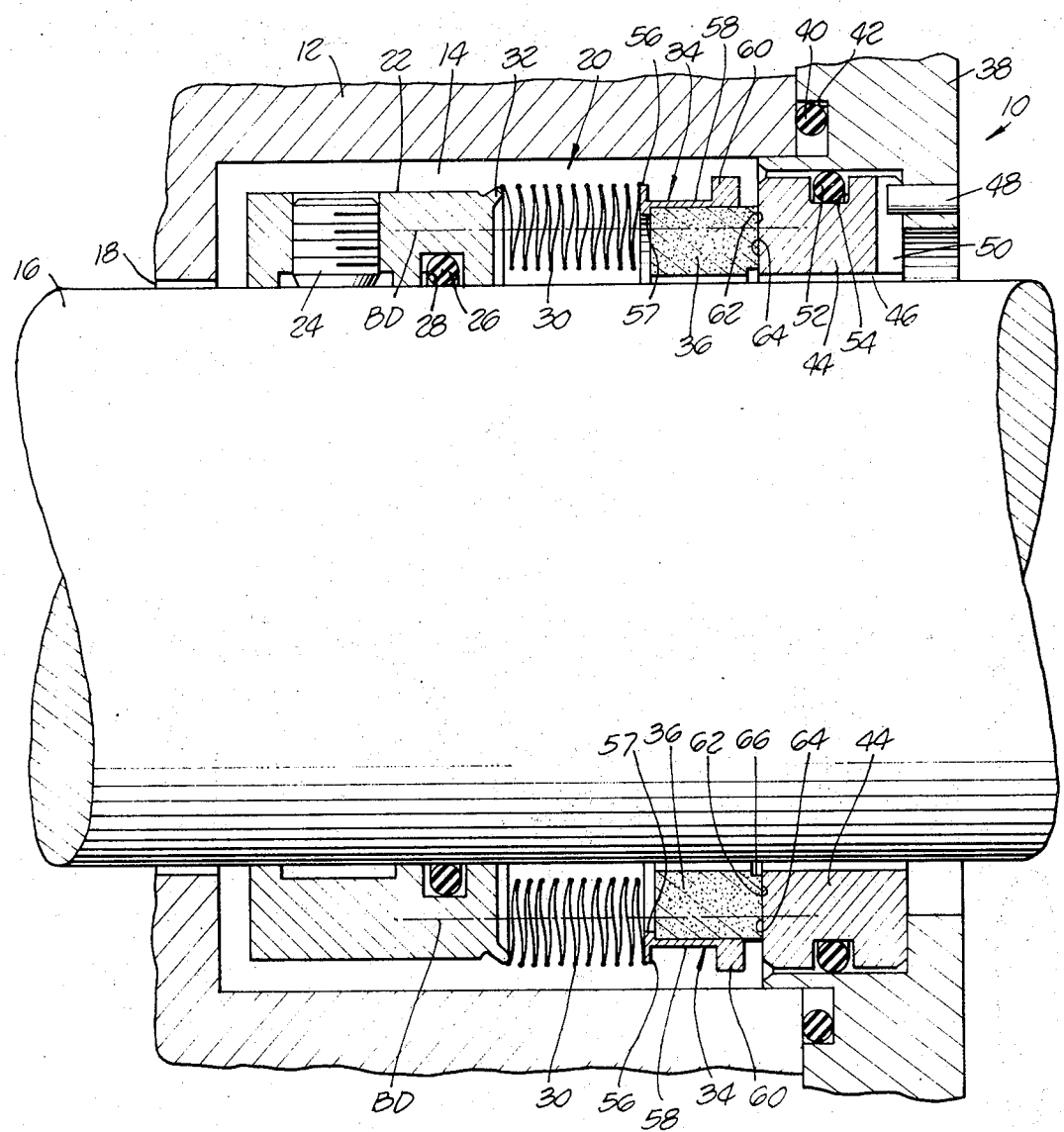
FIG. 1 is an axial sectional view of an exemplary fluid seal of the present invention as installed with a stationary support member and about a rotatable shaft member.

Referring now to FIG. 1, the seal combination 10 of the present invention is shown mounted within a housing member 12 having a seal chamber 14. The seal 10 is mounted about a rotatable shaft member 16 which extends into housing 12 through a shaft opening 18. The housing 12, which confines fluid under pressure, may be a pump housing, for example. The shaft 16 may carry a pump impeller or impellers (not shown) mounted within housing 12 and may be rotated by a driver (not shown) such as an electric motor or a steam or gas turbine. The shaft is journaled as is conventional in suitable bearings (not shown).

A rotatable sealing ring structure 20 is mounted within seal chamber 14 and secured to shaft 16 for rotation therewith. The seal structure 20 includes a bellows support member 22 which may be secured to the shaft 16 by means of one or more set screws 24. The support member 20 may be sealed with respect to shaft 16 by means of an O-ring seal 26 positioned in a groove 28 as shown. An extendible metal bellows 30 is welded to a lip 32 defined on one end of support member 22. A seal ferrule 34 is connected to the other end of bellows 30. The weld joints as shown to join the annular components of bellows 30 and to join the bellows with lip 32 and to a lip 56 of ferrule 34 form hermetic seals between these members. Bellows 30 may be conventional in design and is mounted in a close pitch relationship so that minimum stress is imposed on the bellows.

The ferrule 34 carries a rotatable sealing ring 36 which may be of carbon or other suitable material as later mentioned. The sealing ring 36 may be joined into the ferrule 34 by pressing, shrink fitting or other suitable means, to provide a fluid tight joint between these members and to provide that any strain or deflection resulting from applied stress or unit loading will be commonly borne and shared by these members as later mentioned.

Seal chamber 14 is exteriorly enclosed by a closure member or flange 38 which is connected to housing 12 by means of cap screws, studs and nuts or the like (not shown). An 0-ring 40, received in an accommodating groove 42 defined in flange 38, seals the flange with the housing. A stationary sealing ring 44 is fitted into an accommodating recess 46 defined in flange 38 in axial alignment with shaft 16. An index pin 48 is fitted into the flange 38 and extends into a slot 50 formed in sealing ring 44 to prevent rotation of the sealing ring. An O-ring 52 is interposed within recess 46 and an O-ring groove 54 defined around seal ring 44 to provide a seal between the flange and the ring.

Ferrule 34 is seen to comprise a flange or lip 56, to which bellows 30 is welded, a small inner rear flange 57, a thin barrel or sleeve 58 extending forward toward the face or nose of sealing ring 36, and a reinforcing or supporting ring member 60 disposed about the forward end of sealing ring 36. Support ring 60 is shown as being rectangular in cross-section for machining convenience, but could be of other shapes as long as the cross-sectional area and consequent elastic strength or resistance to compressive deflection remains substantial in comparison to the relative combined resistance to compressive deflection of the sealing ring 36, lip 56, rear flange 57, and sleeve 58. The "balance diameter" of the sealing ring structure 20, as herein mentioned, is generally indicated as lines BD.

As is conventional with seals of this type, seal rings 36 and 44 have complementary faces 62 and 64, respectively, which are lapped to very close degrees of flatness (in the light band or micron range) and thus such faces are in very intimate sealing engagement when assembled as shown. As shown, seal ring 36 is provided with a small counterbore 66 at the forward or nose end of the ring adjacent the sealing face 62. Such counterbore is provided primarily to ensure full and complete coverage of face 62 against face 64 considering the machine clearance between shaft 16 and the inner bore of sealing ring 44 while maintaining an optimum annular thickness in the material of sealing ring 36.

As is also conventional in seals such as described, seal ring 36 may be a carbon composition such as carbon, phenolic-carbon or metal-carbon, or the like, in which event the ring will have a relatively low modulus of elasticity as compared to the usual alloy steel provided for ferrule 34. Sealing ring 44 may be provided of substantially harder material such as tungsten carbide, stellite, ceramic or the like.

Operational Description of the Prior Art

Figure 4:
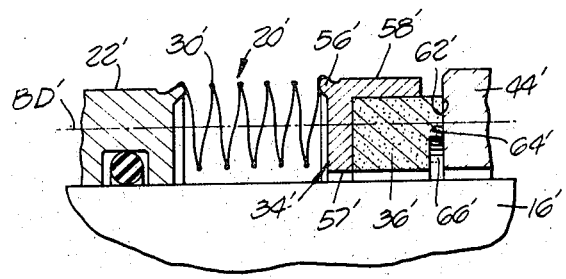
FIG. 4 is a partial sectional view comparable to FIG. 1 but showing a seal in accordance with the prior art.
Figure 5:
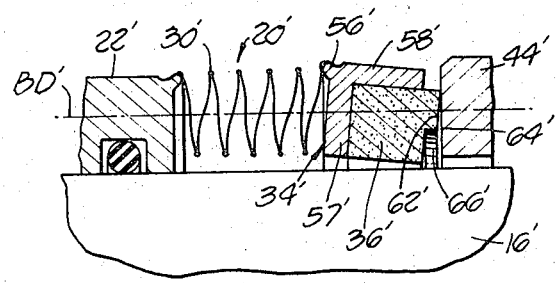
FIG. 5 is a sectional view of the prior art structure as shown in FIG. 4 with a high fluid pressure applied across the seal.
Figure 6:
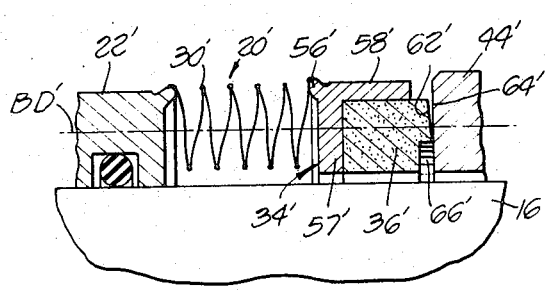
FIG. 6 is a sectional view of the prior art structure of FIG. 5 after the seal has been in operation under pressure for a substantial period and the pressure subsequently removed.

Referring now to FIGS. 4–6, a typical prior art seal structure is shown at various operational phases. For purposes of comparative description, similar elements are designated the same numbers as are shown in FIG. 1 but as primed numbers.

As shown, ferrule 34' is relatively massive in relation to sealing ring 36' with the inner rear flange 57' substantially thick and extending inwardly a considerable distance. Sleeve 58' is also of considerable thickness. Flange 57' and sleeve 58' serve to form a substantial mass serving to support the rear of seal ring 36' against elastic deflection but provide little support to the front or nose end at face 62'. Also shown is a line BD' which is representative of the mean diameter of the bellows which is generally termed and considered, as previously mentioned, to be the "balance diameter" of a bellows seal of this type. The diameter BD' as shown is representative and will vary with the type and pitch of the seal bellows as well as the geometry of the seal structure. It is to be noted, however, that the major area of contact of seal face 62' with face 64' is outside the diameter BD' with a substantially larger counterbore 66' serving to decrease the sealing contact area within diameter BD'. Such construction serves to overbalance the seal face 62' toward face 64' in response to fluid pressure applied across the seal bellows 30' (from within seal chamber 14 through shaft opening 18 for illustration) which is desirable to some extent. However, such construction also serves to cause a substantial hydraulic load on the seal face due to the loss of opposing unloading forces from the bellows within the diameter BD'.

The foregoing situation is illustrated in FIG. 5, and, as shown, is further aggravated by the provision of a large mass of metal in ferrule 34' at the rear of sealing ring 36'. Since the metal of ferrule 34' is many times more resistant to deflection than the material of sealing ring 36' (tenfold, for example), the fluid pressure tends to tip the face 62' inwardly. As shown, the contacting portion of face 62' becomes restricted to the outside edge which causes undue restriction of the slight fluid leakage or migration between the seal faces which is vital to proper lubrication and maintenance of the integrity of the seal face 62'.

It is to be noted at this point with reference to FIGS. 5 and 6 and later with reference to FIGS. 2 and 3, that the tilting of the rotatable sealing ring and consequent tipping of the seal face is considerably exaggerated for purposes of illustration.

In actual operation the maximum gap appearing between the inner periphery of the seal face 62' and 64' as shown in FIG. 5 would actually be only in the range of a few microns or less. Nevertheless the action does exist and may be biased toward a favorable or unfavorable distribution of lubricating film by modification by the parameters herein described.

After the seal structure has been in operation for some time under fluid pressure as shown in FIG. 5, some measure of wear occurs to the face 62', ultimately permitting a small amount of fluid leakage and consequent lubrication for the seal to reach an equilibrium condition permitting acceptable operation.

The seal 20' thereon will likely operate in an acceptable manner until the fluid pressure across the seal is released. At such time the seal assumes the position and condition shown in FIG. 6. As shown, the wear about the outer periphery of seal face 62' has created a gap sufficiently great for fluid pressure to permeate between seal faces 62' and 64' and to exert a resultant axial force against the seal face 62'. When fluid pressure is restored across the seal 20' as shown in FIG. 6, particularly as applied in a gradual manner as is usual, the fluid pressure imposed against seal faces 62' creates a force in opposition to the force created by the bellows 30'. Such opposing force thereby causes excessive leakage between seal faces 62' and 64' and a proper sealing function of the seal 20' cannot be retained unless the contacting area is very near or outside the balance diameter with very low fluid pressure applied across the bellows. To prevent this condition, prior art seals 20' must avoid a seal face 62' which radially extends very far into the region below the mean diameter BD'. Such limitation requires that the seal face 62' may be larger in area only if such area is provided largely outside the balance diameter BD', thus increasing the overall size of the seal package to the exclusion of its application in installations where space is limited. Also important is that a large area for seal face 62' is desirable to permit acceptable unit loading with seals having higher spring rates as caused by stronger bellows made of thicker and less critical stock.

Operational Description of the Preferred Embodiment

Figure 2:
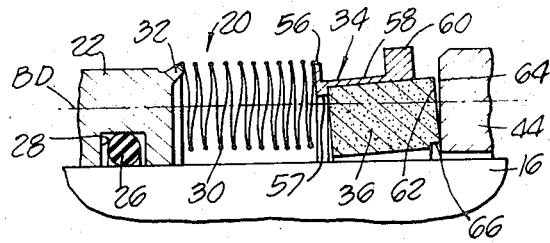
FIG. 2 is a partial sectional view of the structure as shown in FIG. 1 with a high fluid pressure applied across the seal.
Figure 3:
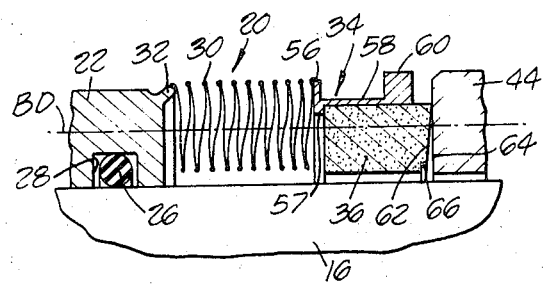
FIG. 3 is a sectional view of the structure as shown in FIG. 2 after the seal has been in operation for a substantial period and the pressure subsequently removed.

Referring to FIGS. 1–3, the sealing ring structure 20 of the seal combination 10 is mounted as shown with bellows 30 in slight elastic compression to initially urge seal faces 62 and 64 into intimate contact.

Application of fluid pressure across bellows 30 (applied within seal chamber 14 through shaft opening 18 for illustration) serves to cause the bellows to transmit an axially distending hydraulic loading force on the composite structure of ferrule 34 and sealing ring 36. Such fluid pressure also imposes radial loading on bellows 30 and ferrule 34.

It is to be noted that the sealing ring structure 20 as shown is provided with a majority of the sealing area of seal face 62 within the balance diameter BD. The seal structure 20, under application of fluid pressure as described above, tends to assume the position shown in FIG. 2. The support member 60 provided by ferrule 34 at the nose or front of seal ring 36 resists deflection or elastic deformation responsive to the fluid pressure and consequently applied force while the remainder of ferrule 34 and the less supported rear of seal ring 36 is more responsive to deflection.

As shown, such resultant variations in deflection cause the sealing ring 36 to tend to assume a cone shaped configuration tapering inwardly from seal face 62 at the nose of the ring to the rear of the ring. Such deflection tends to cause a gap between seal faces 62 and 64 which increases from forceful contact at the inner periphery of seal face 62 to a maximum separation at the outer periphery of seal face 62. As discussed with the prior art, the maximum gap as drawn is greatly exaggerated for illustration and would in practice be in the micron range.

Depending on the elastic modulus of the materials comprising ferrule 34 and seal ring 36 and the magnitude of the fluid pressure applied, the gap as shown also may be considered to be a varied unit loading gradient of seal face 62 with seal face 64 which increases from the outer periphery of face 62 toward the inner periphery of the face that becomes manifest as a nonuniform wear pattern when the fluid pressure loading is removed rather than an actual gap or separation as shown. The structure and loading above enhances the necessary fluid film leakage generation between seal faces 62 and 64 as required for proper operation of seals of this kind while insuring that, at very low pressure restarting conditions, the initial sealing contact remains sufficiently outside the actual balance diameter to permit resealing.

Any wear of seal ring 36 under continued operation of the seal under the conditions as shown in FIG. 2 will be minimal at the outside periphery of the seal face 62 and will increase toward the inner periphery of the face. Consequently, when fluid pressure is released from the seal structure 20, the structure relaxes to the position shown in FIG. 3. Any wear on seal face 62 will be greatest at its inner periphery and declining towards its outer periphery, causing a gap decreasing toward the outer periphery of seal face 62 such as illustrated in FIG. 3 (or an increase in unit loading between the seal faces 62 and 64 from the inner to the outer periphery of seal face 62.)

The importance of the seal ring behavior such as described above is that when such pressure is released the maximum sealing contact force between seal faces 62 and 64 is outside the mean diameter BD which is essentially the actual balance diameter at the low pressure at which resealing must be initiated, in contrast to the prior art where the relaxed sealing contact is, after wear, near or within diameter BD with the likelihood of failure to reestablish sealing conditions should an attempt be made to use a larger portion of the space available within the diameter BD for sealing face.

When pressure is reapplied to the seal structure 20 as shown in FIG. 3, the sealing action is immediate and effective whether the pressure is applied gradually or abruptly. When such pressure is reapplied and operation of seal structure 20 is resumed, the seal ring 36 will again assume the position shown in FIG. 2 though the gap (or change in unit loading) shown between seal faces 62 and 64, as shown in FIG. 2, may be reduced or eliminated by previous compensating wear.

With the improved seal of the invention as described herein and shown in FIGS. 1–3, the seal combination 10 may be successively operated under repeated applications and releases of fluid pressure and under variations of applied fluid pressure despite the utilization of the previously unused area within the balance diameter. Repeated tests with extended operating times under controlled conditions have verified the operational characteristics of the improved seal combination as described and shown in FIG. 1–3. It is also to be noted that the improved seal combination 10 will function as described if fluid pressure is applied within bellows 30 from outside flange 38 rather than within chamber 14 as described.

For illustration in the drawings, the respective seal faces are shown tipped in response to pressure and with reversed patterns after pressure. These effects are not only greatly exaggerated for purposes of illustration but are to some degree over simplified. Due to the minute dimensions involved and relatively high loads on material of low elastic modulus, it will also be acceptable to consider such behavior as non-uniform loading of a soft surface on a flat, hard and abrading surface. Thus, after wear the seal face in the relaxed state exhibits out of flatness that is related to the initial tendency to tip. Additionally, temperature gradients and other factors are responsible for some effects. Nonetheless, it is the purpose of the design to provide an elastic recovery such that these effects are not permitted to result in contact of the design seal faces at a diameter which is less than the effective balance diameter BD at very low pressures after being worn from high pressure operation.

It is to be noted further, that some other variations of structure can be made for the seal ring structure 20 and include the requirement and concept that the forward or nose end of the seal ring 36 be supported against elastic deformation or deflection to a greater extent than the rear of the ring 36 and adjacent bellows 30 so that the increasing hydraulic loading moves the maximum unit loading between the seal faces 62 and 64 from the outer periphery of the seal face 62 towards its inner periphery.

It is seen that the configurations of the invention produce characteristics which, while existing in non bellows types of seals, have not previously been employed in bellows seals where the problem of attaching the carbon to the metal bellows has made a composite structure of undesirable deflection characteristics necessitating the wasteful use of space or the employment of narrow faces that compromise optimum bellows design.

It is further seen that the structure of this invention is less dependent upon the unloading characteristics of a bellows and thus permits the use of bellows at very close pitch where its pressure resisting capability is greatly enhanced.

It is to be understood that, though a single embodiment of the invention is disclosed herein, other embodiments such as will occur to those skilled in the art are intended to be included within the spirit of the invention as permitted by the prior art.

That being claimed is:

1. A diaphragm bellows type mechanical seal comprising: a first sealing ring structure provided with a first annular lapped sealing face on its front end, a second sealing ring structure provided with a second complementary annular lapped sealing face on its front end, an extendible bellows means hermetically connected to the rear end of said second sealing ring structure and adapted to force said lapped sealing faces together in sealing relation responsive to fluid pressures of different magnitudes applied to the opposite sides of said bellows means, said bellows means comprising a plurality of axially aligned, annular, flexible metal diaphragm portions meeting at acute angles along successive inner and outer diamters, radial support means incorporated with said second sealing ring structure which is adapted to modify the resistance to radial elastic deflection of said second sealing ring structure caused by application of fluid pressures of different magnitudes to the inner and outer peripheries of said second sealing ring structure, said radial support means providing said second sealing ring structure with a greater resistance to radial elastic deflection at its front end near said second lapped sealing face than at its rear end so that said second sealing ring structure, with a higher fluid pressure applied to its outer periphery than to its inner periphery, will deflect radially inwardly to a greater extent at its rear end than at its front end thereby warping said second lapped sealing face into a surface configuration wherein the outer circumference thereof is displaced in a direction axially away from the direction of sealing engagement with said first lapped sealing face, the major portion of the area of said second lapped sealing face being disposed radially within the mean diameter of said bellows means, and the remainder of said area being a substantial portion thereof, being disposed radially outside of said mean diameter.

2. A diaphragm bellows type mechanical seal comprising: a first sealing ring structure provided with a first annular lapped sealing face on its front end, a second sealing ring structure provided with a second complementary annular lapped sealing face on its front end, an extendible bellows means hermetically connected to the rear end of said second sealing ring structure and adapted to force said lapped sealing faces together in sealing relation responsive to fluid pressures of different magnitudes applied to the opposite sides of said bellows means, said bellows means comprising a plurality of axially aligned, annular, flexible metal diaphragm portions meeting at acute angles along successive inner and outer diameters, radial support means incorporated with said second sealing ring structure which is adapted to modify the resistance to radial elastic deflection of said second sealing ring structure caused by application of fluid pressures of different magnitudes to the inner and outer peripheries of said second sealing ring structure, said radial support means providing said second sealing ring structure with a greater resistance to radial elastic deflection at its front end near said second lapped sealing face than at its rear end so that said second sealing ring structure, with a given fluid pressure difference applied radially thereacross, will deflect radially to a greater extent at its rear end than at its front end thereby warping said second lapped sealing face into a surface configuration wherein that circumference thereof that is adjacent to the higher pressure fluid is displaced in a direction axially away from the direction of sealing engagement with said first lapped sealing face, the major portion of the area of said second lapped sealing face being disposed on the lower fluid pressure side of the mean diameter of said bellows means and the remainder of said area, being a substantial portion thereof, being disposed on the higher fluid pressure side of said mean diameter.

3. The bellows seal of claim 1 wherein said second sealing ring structure comprises a sealing ring of low elastic strength mounted within a ferrule of high elastic strength, said ferrule including a deflection reinforcing member disposed at the front of said second sealing ring structure near said second sealing face.

4. The bellows seal of claim 1 wherein said second lapped sealing face is comprised of carbon and said first lapped sealing face is comprised of a hard metal alloy.

5. The bellows seal of claim 1 wherein said second sealing ring structure and said bellows means are adapted for mounting on a rotatable shaft and said first sealing ring structure is adapted for mounting on a stationary housing.

* * * * *